(No Model.) 2 Sheets—Sheet 1.

M. M. BROPHY.
APPARATUS FOR HEATING AND CIRCULATING WATER.

No. 590,014. Patented Sept. 14, 1897.

Witnesses:
J. D. Kingsbury.
Geo. M. Copenhaver.

Inventor.
Michael M. Brophy
By Whitaker Prevost
Attys

THE NORRIS PETERS CO., PHOTO-LITHO., WASHINGTON, D. C.

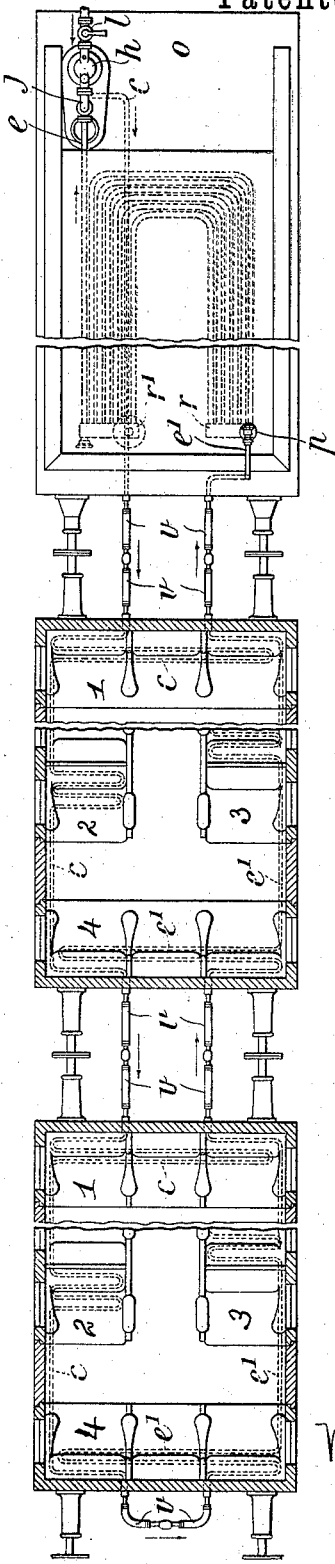

United States Patent Office.

MICHAEL MARY BROPHY, OF LONDON, ENGLAND.

APPARATUS FOR HEATING AND CIRCULATING WATER.

SPECIFICATION forming part of Letters Patent No. 590,014, dated September 14, 1897.

Application filed October 28, 1895. Serial No. 567,130. (No model.) Patented in England May 17, 1893, No. 9,900.

*To all whom it may concern:*

Be it known that I, MICHAEL MARY BROPHY, a subject of the Queen of Great Britain, residing at London, England, have invented new and useful Improvements in Apparatus for Heating and Circulating Water, (for which I have obtained a patent in Great Britain, No. 9,900, dated May 17, 1893,) of which the following is a specification.

My invention relates to the warming of railway-trains and buildings by means of hot water and to supplying such water for use in lavatories, wash-houses, and elsewhere.

It is well known that considerable difficulty exists in economically heating railway-trains by means of hot water and in heating buildings or parts of buildings situated below the source of heat. According to my invention I provide means whereby the water in the pipes of a heating system may be heated and circulated notwithstanding variations of the level of such pipes.

In carrying out my invention I make use of an injector, and preferably one adapted to be operated by exhaust-steam. This injector is introduced into the system of pipes at any suitable point, so that the steam will not only cause the circulation of the water which fills the said system of pipes, but also impart the requisite degree of heat to the same. At or near the top of the heating system I arrange a tank or cistern into which the water is discharged after having made the complete circuit of the pipes and from which it is drawn for again supplying the injector. I provide means for cooling the water if necessary before again passing to the injector, and I also provide an overflow-pipe through which the surplus water due to the condensation of the steam introduced into the pipes can escape.

To enable my invention to be fully understood, I will describe the same by reference to the accompanying drawings, in which, for the purpose of illustration, I have shown the invention as applied for heating a railway-train, and in which—

Figure 1:
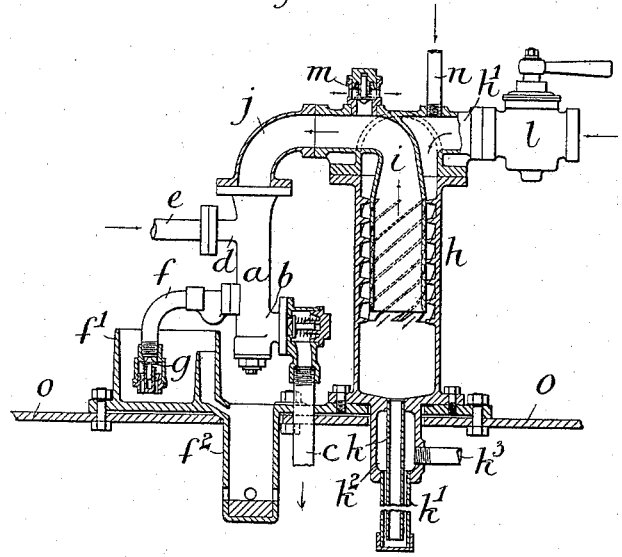
Figure 3:
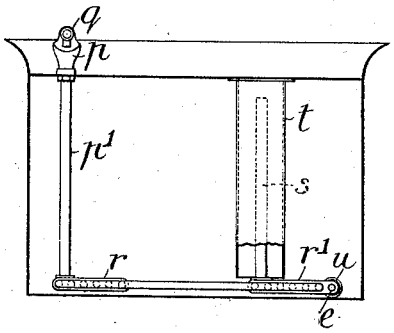
Figures 5, 6:
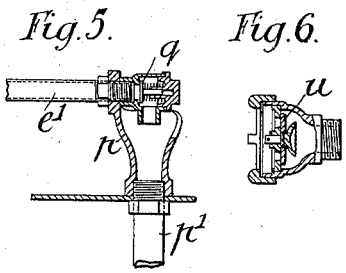
Figure 2:
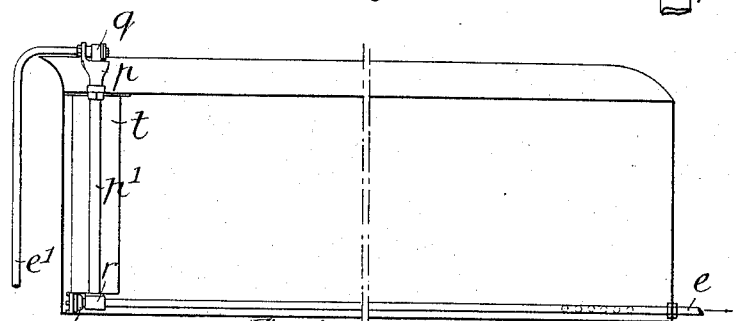
Figure 4:
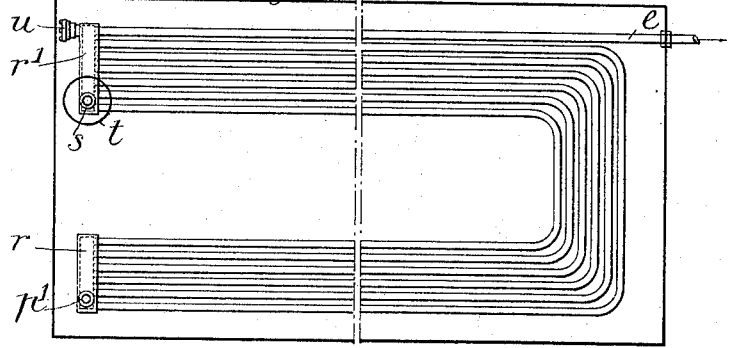

Figure 1 is a sectional elevation of the injector and the parts immediately connected therewith. Fig. 2 is a longitudinal section of a locomotive water-tank in which the cooling hereinbefore referred to is effected and into which the water of condensation is discharged. Fig. 3 is a transverse section, and Fig. 4 is a horizontal section, of the same. Figs. 5 and 6 are sectional elevations of details relating to the said tank. Fig. 7 is a sectional plan of portions of a railway-train heated according to my invention.

$a$ indicates an exhaust-injector of ordinary construction, the discharge-outlet $b$ of which is connected to the flow-pipe $c$ of the system of heating-pipes and the water-inlet $d$ of which is connected by the pipe $e$ with a cistern, tank, or the like, into which the return-pipe $e'$ of the system of circulating-pipes discharges.

$f$ is the usual pipe provided for the overflow of surplus water from the ejector, the said pipe discharging into a tank $f'$, from which the water escapes into a well $f^2$. The injector discharge-nozzle $b$ and the overflow-pipe $f$ are each provided with spring check-valves, such as $g\ g$, for preventing the entrance of air into the injector in case the latter is not working.

As exhaust-steam frequently carries in suspension more or less lubricant, I preferably combine with my injector a grease-extractor, through which the exhaust-steam passes before it reaches the injector. This grease-extractor advantageously consists of an outer casing or chamber $h$, connected by the nozzle $h'$ with the exhaust-pipe, from which the steam is taken, and of an inner casing $i$, connected with the steam-inlet of the injector $j$. The casing $i$, which is open at the bottom, is of smaller diameter than the casing $h$ and extends some distance down within the same, so that the steam which passes to the injector has to pass down between the casings $h$ and $i$ and then up through the latter before it reaches the injector. The space between the two casings is preferably provided with a series of helical or spiral ribs or with obstructions against which the steam will impinge, so as to give up or deposit a large proportion of the grease which it contains.

The lower part of the casing $h$ is provided with a steam-trap of any suitable construction for allowing the escape of the water of condensation and of the grease which forms or is deposited in the said casing $h$. This steam-trap, as shown in the drawings, consists of a downwardly-projecting pipe $k$ and a surrounding pipe $k'$, having at its upper part a chamber $k^2$, from which the discharge takes place through a pipe $k^3$. The pipes $k$ and $k'$ are of such length that a water seal is always preserved sufficient to withstand the pressure in the casing $h$.

$l$ is a cock which serves for regulating the pressure of the steam which passes to the injector. In practice I have found that an exhaust-injector will not work properly when the pressure of the steam exceeds a certain limit. In order, therefore, that this limit shall not be exceeded, I provide on some suitable part of the apparatus adjacent to the injector (for instance, on the top of the casing $i$) a spring escape-valve, such as $m$, which valve is permanently set to allow the steam to escape when the desired pressure is exceeded. When steam is escaping from this valve, it will indicate to the person who controls the working of the apparatus that the pressure is too great, so that he can at once reduce it by means of the valve $l$ to the desired extent.

$n$ is a pipe for admitting live steam into the casing $h$ for the purpose of blowing out any grease deposited on the ribs between the casings $h$ $i$ and any grease or water contained in the trap beneath the said casing or chamber $h$. This pipe also serves for introducing live steam for working the apparatus in case exhaust-steam is not available, the valve $m$ serving to insure that the pressure of the live steam shall not exceed the desired limit.

It is to be understood that the chamber into which the water from the return circulating-pipe $e'$ is discharged and from which the water returns to the injector through the pipe $e$ must in all cases be above the level of the inlet-nozzle $d$ of the said injector, (when an exhaust-injector is used,) as such an injector is not capable of lifting the water which feeds it.

When my apparatus is designed for use upon a railway-train, the injector, with the connected apparatus, as shown in Fig. 1, is preferably arranged upon the foot-plate of the tender, the said foot-plate being indicated by the letter $o$ in Fig. 1, and instead of causing the return-pipe to discharge into a cistern I arrange it to discharge into a funnel $p$ upon the tender, the said funnel being connected to the pipe $e$ (through which the water flows to the injector) by a pipe $p'$, the height of which is sufficient to insure there always being a head of water above the inlet-nozzle $d$ of the injector. The nozzle through which the return-pipe discharges into the funnel $p$ is provided with a non-return valve $q$, a suitable form of spring-valve being shown drawn to an enlarged scale in Fig. 5.

To insure that the water returning to the injector shall be sufficiently cool, the pipe $p'$ is preferably connected to a chamber or box $r$, from which a series of pipes at the bottom of the tender-tank extends to another chamber or box $r'$, from which the water for supplying the injector flows through the pipe $e$, the employment of several pipes, as shown in Fig. 4, affording a large cooling-surface and allowing the water to flow slowly.

As hereinbefore stated, after the pipes are once filled there will always be an excess of water due to the condensation of the steam necessary for working the injector. Such excess of water may overflow from the funnel $p$ into the tank, but in practice I prefer to employ a separate overflow-pipe $s$, arranged within the tank and connected to the box $r'$. This pipe $s$ I preferably surround by a casing $t$, which extends nearly to the bottom of the tank, so that the water which overflows into the said casing will escape therefrom at the bottom, thus allowing any oil or grease which may not have been extracted in the manner hereinbefore described to remain floating upon the water within the said casing without escaping into the tender and so polluting the water therein.

$u$ is a valve which serves for allowing the water from the tender to flow directly into the pipe $e$ to the injector when starting the apparatus—that is to say, when there is no head of water in the pipe $p'$ owing to the circulating-pipes being empty—but which will not allow the level of the water to fall as the water-level in the tank lowers. This valve $u$ is shown in section drawn to an enlarged scale in Fig. 6.

In order that a train provided with a hot-water heating apparatus of the kind hereinbefore described may be warmed before being brought up to a platform of a terminus or while at the platform—that is to say, in order that it may be heated without the aid of exhaust-steam—I preferably connect the cock $l$ of the injector apparatus of the shunting-engine which brings the train to the platform directly to the boiler, in which case the pipe $n$ hereinbefore mentioned will be unnecessary.

The pipes may be arranged in the carriages in any suitable manner. In order, however, that all the compartments of a train shall be heated as uniformly as possible—that is to say, the compartments nearest the engine shall not be overheated and those at the rear end of the train underheated—I prefer to arrange the pipes in the manner shown in Fig. 7, in which the numerals 1, 2, 3, and 4 indicate compartments to be heated. In the arrangement shown in this figure the flow-pipe $c$, which naturally contains the hottest water, is formed into a coil under one seat, and the return-pipe $e'$ is provided with a coil under the opposite seat. With this arrangement it will be understood that in the compartment nearest to the engine the hottest coil is under one seat and the coolest under the other, whereas in the compartment at the rear of the train the two coils are at practically uniform heat.

The circulating-pipes of the different carriages are connected by flexible tubes $v$ $v$, provided with couplings for enabling the said flexible tubes to be readily connected and disconnected. In practice I prefer to make use of couplings provided with valves for preventing the hot water contained in the flexible pipes from escaping when the couplings are disconnected.

Although I have illustrated my invention as being applied for heating a railway-train, it will be obvious that it is also applicable for heating buildings in which there is a supply of exhaust-steam which can be utilized.

Having now particularly described and ascertained the nature of my said invention and in what manner the same is to be performed, I declare that what I claim is—

1. In a heating system, the combination with a circulating system, of a steam-injector in said system, and a cooling device interposed between the injector and the return-pipe of said circulating system, whereby the circulating fluid is cooled before passing to the injector, substantially as described.

2. In a heating apparatus, the combination of an exhaust-injector, means for supplying the injector with exhaust-steam, an inlet-nozzle for water, an outlet-nozzle for the discharge of the steam and water, a system of circulating heating-pipes, a tank situated above the level of said inlet-nozzle, for receiving the return-water from said pipes, means for cooling the water and a pipe connecting the tank with the said inlet-nozzle for delivering the water to the injector, substantially as described.

MICHAEL MARY BROPHY.

Witnesses:
CHARLES BEGBIE SLATER,
FRANK HARVEY.